United States Patent
Arway et al.

(10) Patent No.: US 6,761,791 B2
(45) Date of Patent: Jul. 13, 2004

(54) TWO-WAY SHIPPING LABEL CONSTRUCTION AND METHOD

(75) Inventors: Lawrence W. Arway, Kettering, OH (US); Thomas M. Chase, North Bend, WA (US); Bryce C. Waggoner, Monroe, OH (US); Brian Nicholas, Dayton, OH (US); Gary M. Cairns, Tipp City, OH (US)

(73) Assignee: The Sandard Register Company, Dayton, OH (US)

( * ) Notice: Subject to any disclaimer, the term of this patent is extended or adjusted under 35 U.S.C. 154(b) by 0 days.

(21) Appl. No.: 10/267,020

(22) Filed: Oct. 8, 2002

(65) Prior Publication Data

US 2004/0065407 A1 Apr. 8, 2004

(51) Int. Cl.[7] .............................. B32B 33/00; G09F 3/10
(52) U.S. Cl. ........................ 156/249; 156/277; 156/289; 40/638; 40/675; 283/101
(58) Field of Search ............................... 40/299.01, 638, 40/674, 675; 156/94, 182, 247, 249, 277, 289, DIG. 1; 283/81, 94, 98, 100, 101, 103

(56) References Cited

U.S. PATENT DOCUMENTS

| | | | |
|---|---|---|---|
| 4,696,843 A | 9/1987 | Schmidt | |
| 4,706,877 A | * 11/1987 | Jenkins | ........................ 229/304 |
| RE33,616 E | 6/1991 | Welsch | |
| 5,348,780 A | 9/1994 | Boggs et al. | |
| 5,628,858 A | 5/1997 | Petrou | |
| 5,846,624 A | 12/1998 | Denklau et al. | |

* cited by examiner

Primary Examiner—Richard Crispino
Assistant Examiner—Sing Po Chan
(74) Attorney, Agent, or Firm—Dinsmore & Shohl LLP (57) ABSTRACT

A two-way shipping label construction includes a strip of release material, a first printable label, and a second printable label. The first label is adhered to the strip of release material by the first pressure sensitive adhesive coating and includes at least one customer receipt label defined by a die cut having one or more ties. The first label has a first surface with a release coating on a portion thereof, and a second surface with a first pressure sensitive adhesive coating. The second label has a first surface and a second surface with a second pressure sensitive adhesive coating. The second printable label adheres to the strip of release material by the second pressure sensitive adhesive coating adjacent the first printable label. The second printable label includes at least one manifest label defined by a die cut having one or more ties.

20 Claims, 6 Drawing Sheets

TWO-WAY SHIPPING LABEL CONSTRUCTION AND METHOD

CROSS-REFERENCE TO RELATED APPLICATIONS

None.

STATEMENT REGARDING FEDERALLY SPONSORED RESEARCH OR DEVELOPMENT

Not Applicable.

BACKGROUND OF THE INVENTION

The present invention relates to a label construction and, more particularly, to a shipping label construction of the type which is useful in sending a container in succession to an outgoing address location and to a return address location. The present invention further relates to a method of using such a label construction to re-label a container after it reaches a first location and before it is sent to a second location.

Several prior art label arrangements have been used to repeatedly re-label containers, such as reusable containers. For example, U.S. Pat. No. 5,628,858, issued May 13, 1997, to Petrou discloses a label arrangement in which a placard having a release coating on one side is adhesively secured to a container. The placard is transparent. A succession of pressure sensitive adhesive backed labels can be affixed to the placard surface, in dependence upon the changing contents of the container. While facilitating re-labeling a container, the arrangement of the '858 patent is somewhat inconvenient in that labels that are not in use on a container must be stored separately for subsequent use.

One prior art label arrangement used for sending a container to a succession of locations includes a pair of thermally printable labels, backed with a pressure sensitive adhesive coating, and mounted on a strip of release material. A first, longer label, having a portion bearing a silicone coating, is printed with a return address. A second, shorter label is printed with an outgoing address. The first label is adhesively applied to the container, and then the second label is adhesively applied over the silicone coated area of the first label, obscuring the return address. A small part of the release material is die cut and carried with the second label as it is applied to the first label. This release material part is manually engaged when the second label is to be removed from the first label. While this prior art label arrangement has the advantage that the two labels are kept together on the container, nevertheless it does not provide for additional labels that may be useful for receipts, manifest labels, and the like. It is seen, therefore, that there is a need for a labeling system providing greater flexibility.

SUMMARY OF THE INVENTION

This need is met by the present invention by two-way shipping label construction and by a method of using the two-way shipping label construction to send a container to two address locations in succession. The container may be shipped to an outgoing address location and then sent back to a return address location. It will be appreciated, however, that using the label construction of the present invention the container may be sent from a first location to a second location and then on to a third location. As used herein, a "two-way" shipping label construction means a label construction that can be used to send a container to at least two address locations in succession. Further, as used herein, an "outgoing address" means the address of the first of the two locations, and a "return address" means the address of the second of the two locations. It will be appreciated, however, that in some instances the second of the two locations may be the location from which the container was originally sent. In such an instance, the container is being returned to its original location.

The two-way shipping label construction according to the present invention includes a strip of release material, a first printable label, and a second printable label. The first printable label has a first surface with a release coating on a portion thereof, and a second surface with a first pressure sensitive adhesive coating. The first label is adhered to the strip of release material by the first pressure sensitive adhesive coating. The second printable label has a first surface, and a second surface with a second pressure sensitive adhesive coating. The second printable label is adhered to the strip of release material adjacent the first printable label by the second pressure sensitive adhesive coating. The first printable label may have at least one customer receipt label defined by a die cut having one or more ties. Additionally, or alternatively, the second printable label may have at least one manifest label defined by a die cut having one or more ties.

The second printable label may include at least two manifest labels which are defined by a die cut having one or more ties. The strip of release material may include a die cut circumscribing the manifest label or labels, whereby a portion of the release material is carried with the second printable label when the second printable label is removed from the strip of release material.

The strip of release material may include a die cut circumscribing the at least one customer receipt label. A portion of the release material is carried with the first printable label when the first printable label is removed from the strip of release material.

Preferably, the length and width of the second printable label are less than the length and width of the portion of the first surface of the first printable label having the release coating, respectively. The second printable label may be releasably secured to the portion of the first surface of the first printable label having the release coating. The first surface of the first printable label may carry indicia to assist in positioning of the second printable label on the first surface. In some instances, the release coating may cover substantially all of the first surface of the first label.

The first surface of the first printable label may include an area for printing a return address. The area may be covered with the release coating such that the return address is obscured from view when the second printable label is secured to the first surface of the first printable label. The first printable label may be a thermally printable label, facilitating printing on the portion of the label having a release coating. The first surface of the second printable label may include an area for printing an outgoing address.

In an alternative embodiment of the present invention, the first pressure sensitive adhesive coating comprises a permanent pressure sensitive adhesive coating, and the second pressure sensitive adhesive coating comprises a repositionable pressure sensitive adhesive coating. The strip of release material may comprise a first strip of coated material, and a second strip of uncoated material. The first printable label is adhered to the first strip of coated material and the second printable label is adhered to the second strip of uncoated material. Alternatively, the strip of release material can be a single strip of coated material.

A method of using a shipping label construction for sending a container in succession to an outgoing address location and to a return address location utilizes the shipping label construction described above. The method includes the steps of: printing a return address on the first surface of the first printable label; printing an outgoing address on the first surface of the second printable label; removing the first printable label from the strip of release material and securing the first printable label to the container with the first pressure sensitive adhesive; removing the second printable label from the strip of release material and securing the second printable label to the first printable label with the second pressure sensitive adhesive; shipping the container to the outgoing address location; removing the second printable label from the first printable label; separating the manifest label from the second printable label, and applying the manifest label to a manifest record sheet; and shipping the container to the return address location. The printing steps may include printing manifest information on the at least one manifest label, and additionally or alternatively, printing the at least one customer receipt label defined therein.

The step of securing the second printable label to the first printable label may include the step of securing the second printable label to the first printable label so as to obscure the return address. The step of removing the second printable label from the first printable label may include the step of removing the second printable label so as to reveal the return address.

The strip of release material may include a die cut circumscribing the at least one manifest label. The step of removing the second printable label from the strip of release material and applying the second printable label to the first printable label may include the step of carrying a portion of the release material with the second printable label when the second printable label is removed from the strip of release material.

The first printable label may include at least one customer receipt label defined by a die cut having one or more ties. The strip of release material may include a die cut circumscribing the at least one customer receipt label. The step of removing the first printable label from the strip of release material and applying the first printable label to the container may include the step of carrying a portion of the release material with the first printable label when the first printable label is removed from the strip of release material.

The steps of printing a return address on the first surface of the first printable label, and printing an outgoing address on the first surface of the second printable label and manifest information on the at least one manifest label are preferably accomplished in the course of the same printing operation. The step of printing a return address on the first surface of the first printable label may comprise the step of thermally printing a return address on the first surface of the first printable label. The step of printing an outgoing address on the first surface of the second printable label and manifest information on the at least one manifest label may comprise the step of thermally printing an outgoing address on the first surface of the second printable label and manifest information on the at least one manifest label.

Accordingly, it is an object of the present invention to provide an improved two-way shipping label construction and method of using such a two-way shipping label construction in which a first return address shipping label is mounted on a container and a second outgoing address shipping label is secured by pressure sensitive adhesive to a release coated portion of the first label; to provide such a construction and method in which additional label components, including a customer receipt and a manifest label, are part of the first and second shipping labels, respectively; and to provide such a construction and method in which the labels are printed at substantially the same time.

Other objects and advantages of the invention will be apparent from the following description, the accompanying drawings and the appended claims.

DETAILED DESCRIPTION OF THE PREFERRED EMBODIMENT

Reference is made to FIGS. 1, 2, 4 and 5 of the drawings, which illustrate a two-way shipping label construction according to the present invention. It will be appreciated that in all of the drawings the illustrated elements are not drawn to scale, but rather are drawn to illustrate the preferred embodiment. The construction of FIGS. 1 and 2 includes a strip of release material 10 on which are mounted a first printable label 12 and a second printable label 14. The ends of the strip of release material 10 have been severed by tearing or otherwise at perforations 16 and 18. As will become apparent, a length of such release material may carry a plurality of sets of first and second printable labels and may be stored for subsequent printing in roll form or zig zag folded form.

Figure 1:
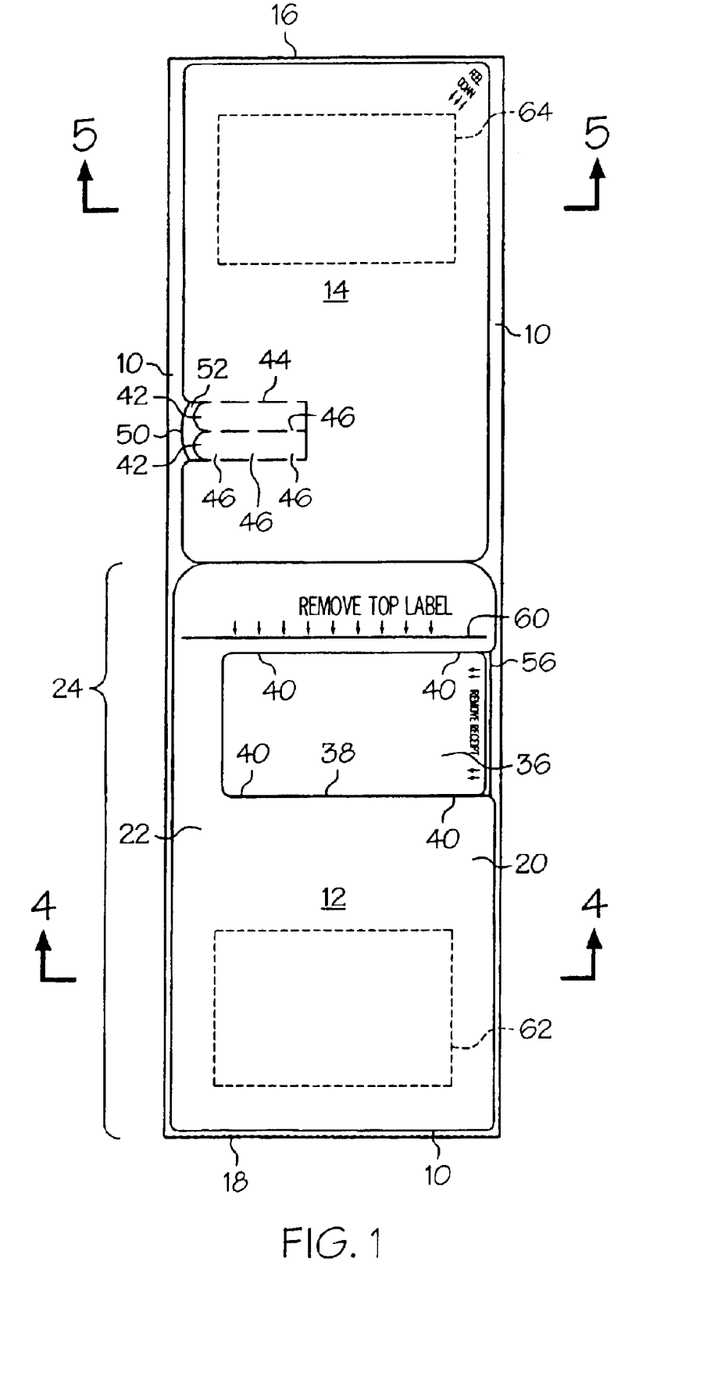
FIG. 1 is a plan view of the front of a two-way shipping label construction according to the present invention.

The first printable label 12 has a first surface 20 with a release coating 22 on a portion thereof, indicated at 24. As shown in FIG. 1, the portion 24 of the surface 20 carrying the release coating 22 is coextensive with the entire surface 20. It will be appreciated, however, that the surface 20 can have a somewhat smaller portion 24 coated with a release coating, depending upon the dimensions of labels 12 and 14. The first label 12 has a second surface 26 with a first pressure sensitive adhesive coating 28. The first printable label 12 is adhered to the strip of release material 10 by the first pressure sensitive adhesive coating 28 prior to use.

Figure 5:
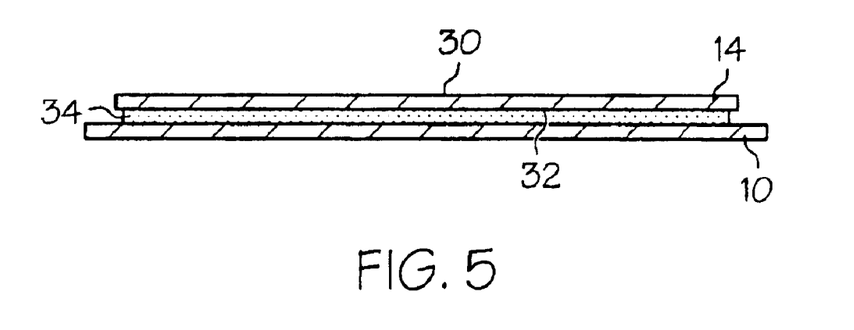
FIG. 5 is a sectional view taken generally along line 5—5 in FIG. 1.

The second printable label 14 has a first surface 30 and a second surface 32. The second surface 32 carries a second pressure sensitive adhesive coating 34. As shown in FIGS. 1 and 5, the second printable label 14 is adhered to the strip of release material 10 by the second pressure sensitive adhesive coating 34 adjacent the first printable label 12.

The first and second printable labels 12 and 14 include label components. The first printable label 12 includes at least one customer receipt label 36, defined by a die cut 38 having one or more ties 40. Similarly, the second printable label 14 includes at least one manifest label, shown as a pair of manifest labels 42 defined by a die cut 44 having one or more ties 46.

Figure 2:
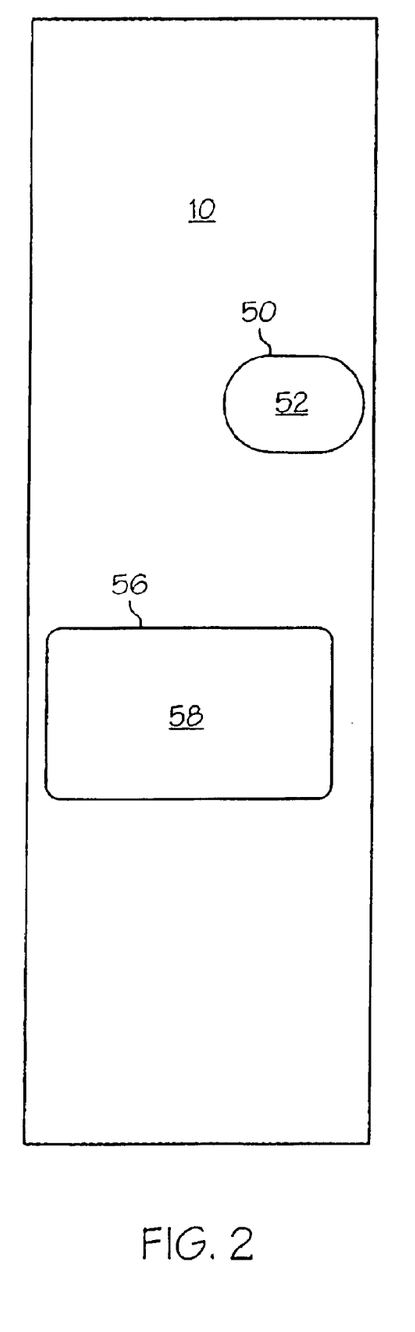
FIG. 2 is a plan view of the back of a two-way shipping label construction according to the present invention.

As seen best in FIG. 2, and as also seen in FIG. 1, the strip of release material 10 includes a die cut 50 circumscribing the manifest label or labels 42. The resulting portion 52 of the release material is carried with the second printable label 14 when the second printable label 14 is removed from the strip of release material 10, as more fully described below. Similarly, as best seen in FIG. 2, and as also seen in FIG. 1, the strip of release material 10 also includes a die cut 56 that circumscribes the customer receipt label 36. The resulting portion 58 of the release material 10 within the die cut 56 is carried with the first printable label 12 when the first printable label 12 is removed from the strip of release material 10.

Figure 3:
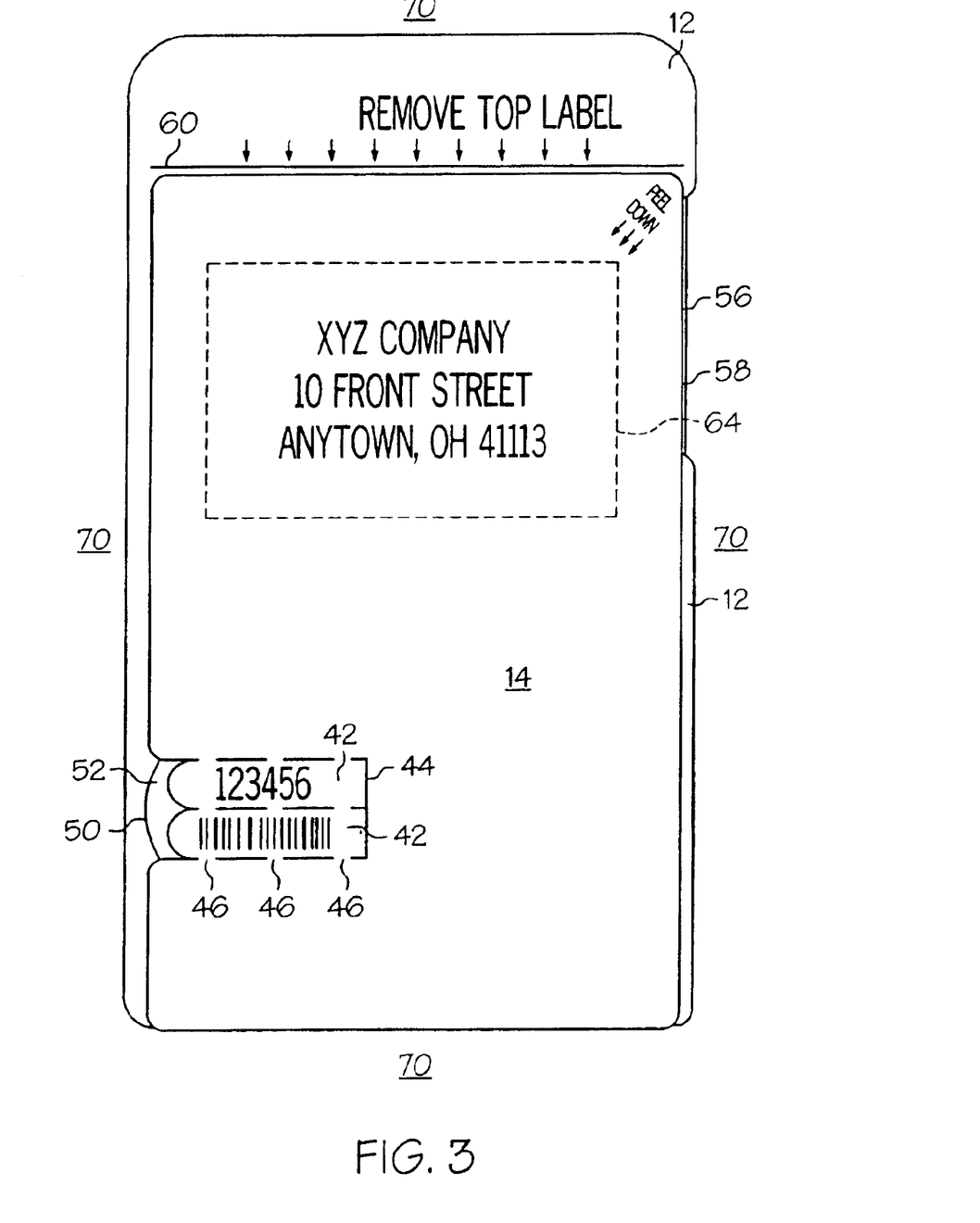
FIG. 3 is an enlarged plan view of the first and second printable labels of the construction of FIGS. 1 and 2 after having been removed from the strip of release material and applied to the surface of a shipping container.
Figure 4:
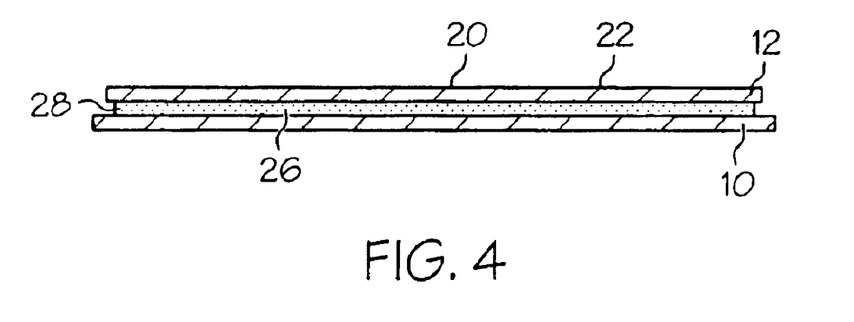
FIG. 4 is a sectional view taken generally along line 4—4 in FIG. 1.

As shown in FIG. 1, the length and width of the second printable label 14 are less than the length and width of the portion 24 of the first surface 20 of the first printable label 12 having the release coating 22, respectively. This permits the second printable label 14 to be secured releasably to the portion 24 during use of the shipping label construction, as more fully described below. FIG. 3 shows label 14 secured to label 12 in this manner. The first surface 20 of the first printable label 12 preferably carries indicia, such as line 60, to assist a user in placing the second printable label 14 on the surface 20 in an appropriate position.

In the embodiment illustrated, the release coating 22 covers substantially all of the first surface 20 of the first label 12. It will be appreciated, however, that since the function of the release coating is to permit the label 14 to be secured to the surface 20 with a pressure sensitive adhesive and then be removed, the release coating 22 need only coat an area on surface 20 that is coextensive with the label 14. As is shown in FIG. 3, label 14 is slightly smaller than first printable label 12. As described below, in use it is desirable to print a return address on the first printable label 12. If the label 12 is coated completely with a release coating on the surface 20, then it is preferable that the first printable label 12 is a thermally printable label and the release coating is a transparent coating. Alternatively, however, the return address may be printed before the label 12 is coated with the release coating. Further, alternatively, less than all of the surface 20 of the label 12 may be coated, and the return address may then be printed on the un-coated portion of the surface 20.

FIG. 1 depicts in dashed lines areas 62 and 64 where a return address on label 12 and an outgoing address on label 14, respectively, are to be printed. The dashed lines are used in the accompanying drawings to suggest the general areas of the label surfaces where such addresses are printed; the dashed lines would not appear on the labels themselves, however. As will be noted from FIG. 3, when the label 14 is secured to label 12, the return address in area 62 is obscured.

The manner of use of the label construction of the present invention in sending a container in succession to an outgoing address location and to a return address location is as follows. It will be appreciated that while the two addresses are referred to as an outgoing address and a return address, respectively, the label construction of the present invention may be utilized in sending a container to any successive locations. Thus the container may be sent in a manner that does not result in the container returning to its point of origin. Such use is within that contemplated for the present invention.

At the outset, addresses are printed in areas 62 and 64 of labels 12 and 14, respectively. There are a number of ways in which this can be accomplished. The outgoing address may be printed on label 14 at essentially the same time and using the same printer as is used to print the return address on label 12. Printing can be accomplished using any one of a number of known printer devices, including laser jet printers, ink jet printers, contact printers, such as dot matrix printers, and thermal printers. As mentioned previously, thermal printing may facilitate printing on label 12 if the entire upper surface of label 12 is coated with a release coating, because such a coating resists most printing inks and toners. Alternatively, printing the addresses on labels 12 and 14 can be accomplished at different times using different printer mechanisms. For example, if a series of containers are going to be shipped to a variety of addresses, and then returned to the same address (for example a product service center), the labels 12 can all be pre-printed with an identical return address. This would permit printing with identical return address information with any known printer, and then overcoating the printed return address with the release coating.

Typically, manifest information will be printed on the labels 42 at the same time that the outgoing address is printed on label 14. The manifest information may typically be numeric or bar code information, or both, as illustrated in FIG. 3.

After the labels are printed, the first printable label 12 is removed from the strip of release material 10 and secured to the surface 70 of a container with the first pressure sensitive adhesive 28. The portion 58 of the release material 10 within the die cut 56 is carried with the first printable label 12 when the first printable label 12 is removed from the strip of release material 10, and is held in place behind the receipt label 36 as the label 12 is secured to the container with the adhesive 28. Next, the second printable label 14 is removed from the strip of release material 10 and is secured to the first printable label 12 with the second pressure sensitive adhesive 34, as shown in FIG. 3. The portion 52 of the release material 10 within the die cut 50 is carried with the second printable label 14 when the second printable label 14 is removed from the strip of release material 10, and is held in place behind the manifest labels 42 as the label 14 is secured to the label 12 with the adhesive 34. As will be noted, second printable label 14 is positioned on first printable label 12 so as to obscure the return address in area 62. As will be further noted, the length and width of the second printable label are less than the length and width of the portion of the first surface of the first printable label having the release coating, respectively and this facilitates the application of the second printable label 14 to the surface 20 of label 12.

The container, carrying the labels 12 and 14 as shown in FIG. 3, is now shipped to the outgoing address location. When the container reaches the outgoing address location, the second printable label 14 is removed from the first printable label 12 so as to reveal the return address in area 62. Additionally, the manifest labels 42 are separated from the second printable label 14. This can occur either before or after the label 14 is removed from label 12. The manifest labels 42 may then be applied to a manifest record sheet.

Next, the shipping container is to be shipped to the return address location. Prior to shipping the container, the receipt label 36 is removed from the label 12. Typically, portion 58 of the release material 10 will remain with the label 36. The receipt can be stored loose in an appropriate file or, if desired, the portion 58 of the release material can be removed from the label 36, permitting it to be affixed adhesively to a record sheet.

Figure 6:
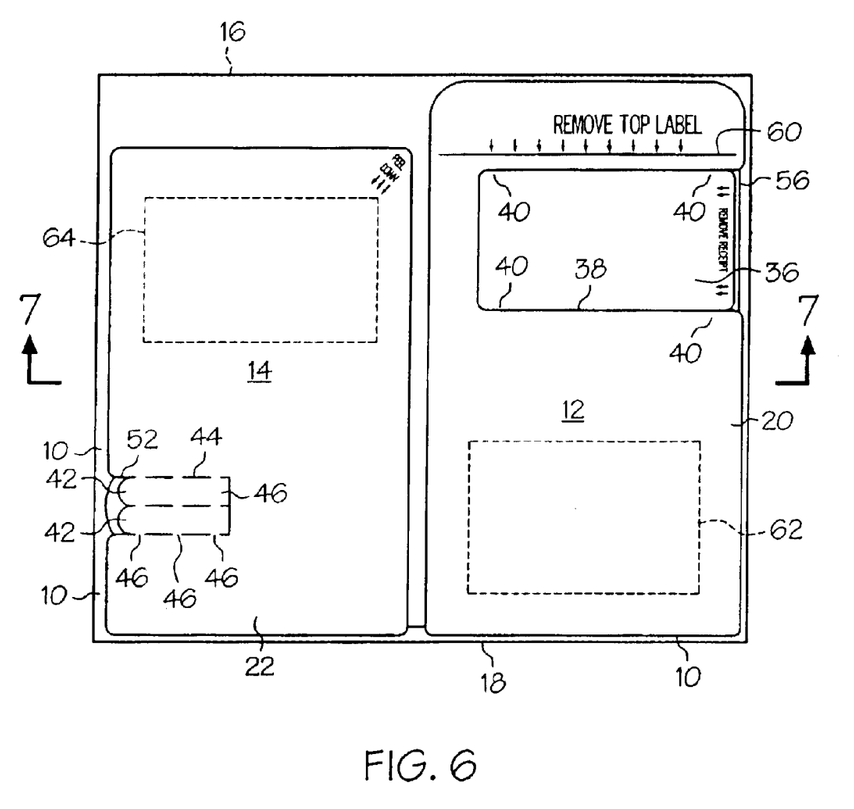
FIG. 6 is a plan view of the front of a two-way shipping label construction according to an alternative embodiment of the present invention.
Figure 7:
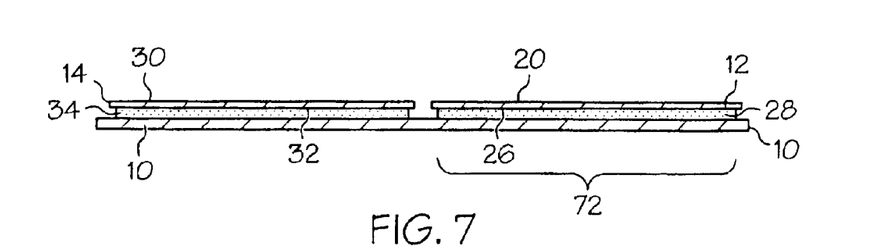
FIG. 7 is a sectional view taken generally along line 7—7 in FIG. 6.

Reference is now made to FIGS. 6 and 7 which illustrate an alternative embodiment of the shipping label construction according to the present invention. The same reference numerals are used in these figures as those used in regard to the embodiment described above to designate corresponding elements. In the alternative embodiment, the first printable label 12 and the second printable label 14 are positioned side by side on the strip of release material 10. In this embodiment, the first pressure sensitive adhesive coating 28 comprises a permanent pressure sensitive adhesive coating, and the second pressure sensitive adhesive coating 34 comprises a repositionable pressure sensitive adhesive coating.

As a consequence, the strip 10 may be only partially coated with a release coating such that it has a coated portion 72 and an uncoated portion making up the balance of the strip 10. The first printable label 12 is adhered to the coated portion 72 of the strip 10, and the second printable label 14 is adhered to the uncoated portion of the strip 10. If desired, however, a different coating may be applied to the portion of the strip 10 on which the second label 14 is mounted. This coating may be chosen for its compatibility with repositionable adhesives. As yet another alternative, the strip 10 may have a release coating over substantially all of its surface, as long as a coating is used which is compatible with both permanent pressure sensitive adhesive 28 and repositionable adhesive 14.

Figure 8:
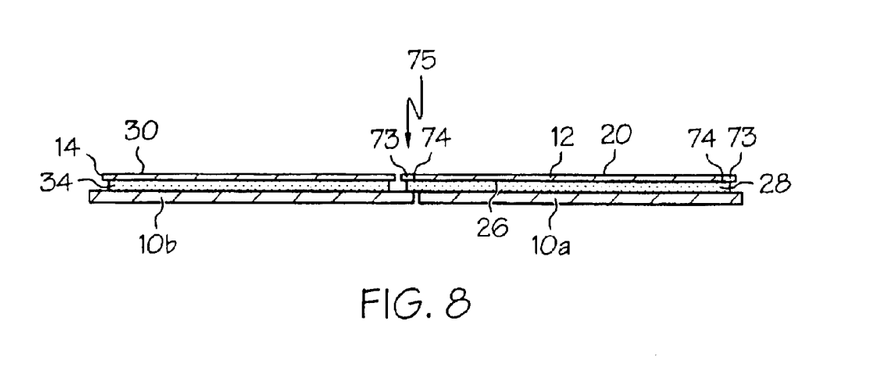
FIG. 8 is a sectional view of yet another embodiment of the present invention, as taken along line 7—7 in FIG. 6.

A third embodiment of the present invention is shown in FIG. 8. In this embodiment, the strip of release material comprises a first strip of coated material 10a, and a second strip of uncoated material 10b. The first printable label 12 adhered to the first strip 10a of coated material and the second printable label 14 is adhered to the second strip 10b of uncoated material. By "uncoated" it is meant that strip 10b does not carry a coating of conventional release material of the type used with permanent adhesives. It will be appreciated, however, that uncoated strip 10b may nevertheless have a surface coating of another material which facilitates the use of a repositionable adhesive. In this embodiment, a matrix 73 surrounds the first label 12. The matrix 73 is material that remains after the label 12 is die cut at 74 from a strip of label material. The matrix material 73 is not stripped from around the label 12 as is the case with the earlier described embodiments. An overlap, generally indicated at 75, exists between matrix material 73 and the second strip 10b. The adhesive 28 between the matrix material 73 and the strip 10b keeps the labels 12 and 14 and corresponding strips 10a and 10b together, as shown in FIG. 8. Since the adhesive 28 is permanent pressure sensitive adhesive and the strip 10b is uncoated, the matrix 73 and the strip 10b remained attached, even though the width of the overlap is relatively small. By this approach, the label 12 and strip 10a may be processed, i.e., coated, die cut, printed, etc., separately from label 14 and strip 10b, and then the labels 12 and 14, and their respective strips of release material 10a and 10b, subsequently assembled.

It will be appreciated that other variations in the construction of FIG. 8 may be utilized. For instance, the part of the matrix that surrounds the label 12 could be removed from the construction while leaving a strip of the matrix extending longitudinally, bridging the labels 12 and 14 and overlapping strips 10a and 10b. Such a strip of matrix material would carry a coating of permanent adhesive 28, such that it holds the construction together.

Having described the invention in detail and by reference to preferred embodiments thereof, it will be apparent that modifications and variations are possible without departing from the scope of the invention defined in the appended claims.

What is claimed is:

1. A method of using a shipping label construction in sending a container in succession to an outgoing address location and to a return address location, said shipping label construction having a strip of release material, a first printable label having a first surface with a release coating on a portion thereof, and a second surface with a first pressure sensitive adhesive coating, said first printable label adhered to said strip of release material by said first pressure sensitive adhesive coating, and a second printable label having a first surface, and a second surface with a second pressure sensitive adhesive coating, said second printable label adhered to said strip of release material by said second pressure sensitive adhesive coating adjacent said first printable label, said second printable label including at least one manifest label defined by a die cut having one or more ties, comprising the steps of:

printing a return address on said first surface of said first printable label, printing an outgoing address on said first surface of said second printable label and manifest information on said at least one manifest label, removing said first printable label from said strip of release material and securing said first printable label to said container with said first pressure sensitive adhesive, removing said second printable label from said strip of release material and securing said second printable label to said first printable label with said second pressure sensitive adhesive, shipping said container to the outgoing address location, removing said second printable label from said first printable label, separating said manifest label from said second printable label, and applying said manifest label to a manifest record sheet, and shipping said container to said return address location.

2. The method of claim 1 in which said step of securing said second printable label to said first printable label includes the step of securing said second printable label to said first printable label so as to obscure said return address, and in which the step of removing said second printable label from said first printable label includes the step of removing said second printable label so as to reveal said return address.

3. The method of claim 1 in which said strip of release material includes a die cut circumscribing said at least one manifest label, and in which the step of removing said second printable label from said strip of release material and applying said second printable label to said first printable label includes the step of carrying a portion of said release material with said second printable label when said second printable label is removed from said strip of release material.

4. The method of claim 1 in which said first printable label includes at least one customer receipt label defined by a die cut having one or more ties, in which said strip of release material includes a die cut circumscribing said at least one customer receipt label, and in which said step of removing said first printable label from said strip of release material and applying said first printable label to said container includes the step of carrying a portion of said release material with said first printable label when said first printable label is removed from said strip of release material.

5. The method of claim 1 in which the length and width of said second printable label are less than the length and width of said portion of said first surface of said first printable label having said release coating, respectively.

6. The method of claim 1 in which the steps of printing a return address on said first surface of said first printable label, and printing an outgoing address on said first surface of said second printable label and manifest information on said at least one manifest label are accomplished in the course of the same printing operation.

7. The method of claim 1 in which the step of printing a return address on said first surface of said first printable label comprises the step of thermally printing a return address on said first surface of said first printable label.

8. The method of claim 1 in which the step of printing an outgoing address on said first surface of said second printable label and manifest information on said at least one manifest label comprises the step of thermally printing an outgoing address on said first surface of said second printable label and manifest information on said at least one manifest label.

9. The method of claim 1 in which said step of removing said first printable label from said strip of release material and securing said first printable label to said container with said first pressure sensitive adhesive is performed prior to performing said step of removing said second printable label from said strip of release material and securing said second printable label to said first printable label with said second pressure sensitive adhesive.

10. The method of claim 1 in which said step of removing said second printable label from said strip of release material and securing said second printable label to said first printable label with said second pressure sensitive adhesive is performed prior to performing said step of removing said first printable label from said strip of release material and securing said first printable label to said container with said first pressure sensitive adhesive.

11. A method of using a shipping label construction to send a container in succession to an outgoing address and to return address, said shipping label construction having a strip of release material, a first printable label having a first surface with a release coating on a portion thereof, and a second surface with a first pressure sensitive adhesive coating, said first printable label including at least one customer receipt label defined by a die cut having one or more ties, said first printable label adhered to said strip of release material by said first pressure sensitive adhesive coating, and a second printable label having a first surface, and a second surface with a second pressure sensitive adhesive coating, said second printable label adhered to said strip of release material by said second pressure sensitive adhesive coating adjacent said first printable label, comprising the steps of:

printing a return address on said first surface of said first printable label, and printing said at least one customer receipt label defined therein, printing an outgoing address on said first surface of said second printable label, removing said first printable label from said strip of release material and securing said first printable label to said container with said first pressure sensitive adhesive, removing said second printable label from said strip of release material and securing said second printable label to said first printable label with said second pressure sensitive adhesive, shipping said container to the outgoing address location, removing said second printable label from said first printable label, separating said customer receipt label from said first printable label, and shipping said container to said return address location.

12. The method of claim 11 in which said second printable label includes at least one manifest label defined by a die cut having one or more ties, in which said strip of release material includes a die cut circumscribing said at least one manifest label, and in which the step of removing said second printable label from said strip of release material and securing said second printable label to said first printable label includes the step of carrying a portion of said release material with said second printable label when said second printable label is removed from said strip of release material.

13. The method of claim 11 in which said strip of release material includes a die cut circumscribing said at least one customer receipt label, and in which said step of removing said first printable label from said strip of release material and applying said first printable label to said container includes the step of carrying a portion of said release material with said first printable label when said first printable label is removed from said strip of release material.

14. The method of claim 11 in which the length and width of said second printable label are less than the length and width of said portion of said first surface of said first printable label having said release coating, respectively.

15. The method of claim 11 in which the steps of printing a return address on said first surface of said first printable label, and printing an outgoing address on said first surface of said second printable label are accomplished in the course of the same printing operation.

16. The method of claim 11 in which the step of printing a return address on said first surface of said first printable label comprises the step of thermally printing a return address on said first surface of said first printable label.

17. The method of claim 11 in which the step of printing an outgoing address on said first surface of said second printable label and manifest information on said at least one manifest label comprises the step of thermally printing an outgoing address on said first surface of said second printable label.

18. The method of claim 11 in which said step of securing said second printable label to said first printable label includes the step of securing said second printable label to said first printable label so as to obscure said return address, and in which the step of removing said second printable label from said first printable label includes the step of removing said second printable label so as to reveal said return address.

19. The method of claim 11 in which said step of removing said first printable label from said strip of release material and securing said first printable label to said container with said first pressure sensitive adhesive is performed prior to performing said step of removing said second printable label from said strip of release material and securing said second printable label to said first printable label with said second pressure sensitive adhesive.

20. The method of claim 11 in which said step of removing said second printable label from said strip of release material and securing said second printable label to said first printable label with said second pressure sensitive adhesive is performed prior to performing said step of removing said first printable label from said strip of release material and securing said first printable label to said container with said first pressure sensitive adhesive.

\* \* \* \* \*

UNITED STATES PATENT AND TRADEMARK OFFICE
CERTIFICATE OF CORRECTION

PATENT NO. : 6,761,791 B2
DATED : July 13, 2004
INVENTOR(S) : Arway et al.

It is certified that error appears in the above-identified patent and that said Letters Patent is hereby corrected as shown below:

Title page,
Item [75], Inventors, "Lawrence W. Arway, Kettering, OH (US); Thomas M. Chase, North Bend, WA (US); Bryce C. Waggoner, Monroe, OH (US); Brian Nicholas, Dayton, OH (US); Gary M. Cairns, Tipp City, OH (US)" should read
-- Lawrence W. Arway, Kettering, OH (US); Thomas M. Chase, North Bend, WA (US); Bryce C. Waggoner, Monroe, OH (US); Brian Nicholas, Dayton, OH (US) --
Item [73], Assignee, "The Sandard Register Company, Dayton, OH (US)" should read -- The Standard Register Company, Dayton, OH (US) --

Signed and Sealed this

Nineteenth Day of April, 2005

JON W. DUDAS
*Director of the United States Patent and Trademark Office*